US008494918B1

(12) United States Patent
Vinnitskiy

(10) Patent No.: US 8,494,918 B1
(45) Date of Patent: Jul. 23, 2013

(54) SYSTEM, METHOD, AND COMPUTERING PROGRAM PRODUCT FOR APPLYING AN OFFER SCHEME TO USAGE DATA USING A USER INTERFACE

(75) Inventor: Andrey Vinnitskiy, Praha (CS)

(73) Assignee: Amdocs Software Systems Limited, Dublin (IE)

( * ) Notice: Subject to any disclaimer, the term of this patent is extended or adjusted under 35 U.S.C. 154(b) by 173 days.

(21) Appl. No.: 12/415,620

(22) Filed: Mar. 31, 2009

(51) Int. Cl.
*G06Q 30/00* (2012.01)

(52) U.S. Cl.
USPC ............. 705/26.4; 705/38; 705/5; 705/26; 705/1; 705/64; 705/14; 705/37; 705/28; 705/22; 705/21; 705/35; 705/34; 455/408; 455/406; 455/7; 455/466; 345/423; 345/441; 345/545; 345/173

(58) Field of Classification Search
USPC ............................................................. 705/26
See application file for complete search history.

(56) References Cited

U.S. PATENT DOCUMENTS

| | | | |
|---|---|---|---|
| 7,707,065 B1 * | 4/2010 | Kangas | 705/26 |
| 2002/0116282 A1 * | 8/2002 | Martin et al. | 705/26 |
| 2002/0194117 A1 * | 12/2002 | Nabe et al. | 705/38 |
| 2003/0055727 A1 * | 3/2003 | Walker et al. | 705/14 |
| 2003/0154125 A1 * | 8/2003 | Mittal et al. | 705/14 |
| 2004/0031049 A1 * | 2/2004 | Suzuki et al. | 725/39 |
| 2004/0172358 A1 * | 9/2004 | Lent et al. | 705/38 |
| 2006/0247973 A1 * | 11/2006 | Mueller et al. | 705/14 |
| 2008/0071634 A1 * | 3/2008 | Rampell et al. | 705/26 |

FOREIGN PATENT DOCUMENTS

WO 2008/051210 5/2008

OTHER PUBLICATIONS

Karaer, Ozgen. Technology investments in supply chains: Impact of new entry, competition, and interventions. ProQuest Dissertations and Theses, 2008.*

* cited by examiner

*Primary Examiner* — F. Zeender
*Assistant Examiner* — Fawaad Haider
(74) *Attorney, Agent, or Firm* — Zilka-Kotab, PC

(57) ABSTRACT

A system, method, and computer program product are provided for applying an offer scheme to usage data using a user interface. In operation, usage data associated with a user is received from a server. Additionally, one or more offer schemes are displayed to the user using a user interface. Furthermore, the user is allowed to apply the one or more offer schemes to the usage data, utilizing the user interface. Still yet, the user is allowed to select one of the one or more offer schemes based on a result of the application, utilizing the user interface.

13 Claims, 6 Drawing Sheets

SYSTEM, METHOD, AND COMPUTERING PROGRAM PRODUCT FOR APPLYING AN OFFER SCHEME TO USAGE DATA USING A USER INTERFACE

FIELD OF THE INVENTION

The present invention relates to software, and more particularly to a user interface for evaluating and selecting an offer.

BACKGROUND

Traditionally, a service provider that provides billable services calculates the chargeable activity of each of its customers periodically based on a pre-arranged contract. The service provider then produces a bill that is calculated according to the pre-arranged contract with the customer. The bill is typically mailed to the customer for payment. In this way, customers are locked into the pre-arranged contract without the opportunity to select a better arrangement.

Additionally, existing billing solutions calculate the bills at a location of the service provider. This may require that the service provider has a large facility to support bill generation for large numbers of customers. There is thus a need for addressing these and/or other issues associated with the prior art.

SUMMARY

A system, method, and computer program product are provided for applying an offer scheme to usage data using a user interface. In operation, usage data associated with a user is received from a server. Additionally, one or more offer schemes are displayed to the user utilizing a user interface. Furthermore, the user is allowed to apply the one or more offer schemes to the usage data, utilizing the user interface. Still yet, the user is allowed to select one of the one or more offer schemes based on a result of the application, utilizing the user interface.

DETAILED DESCRIPTION

Figure 1:
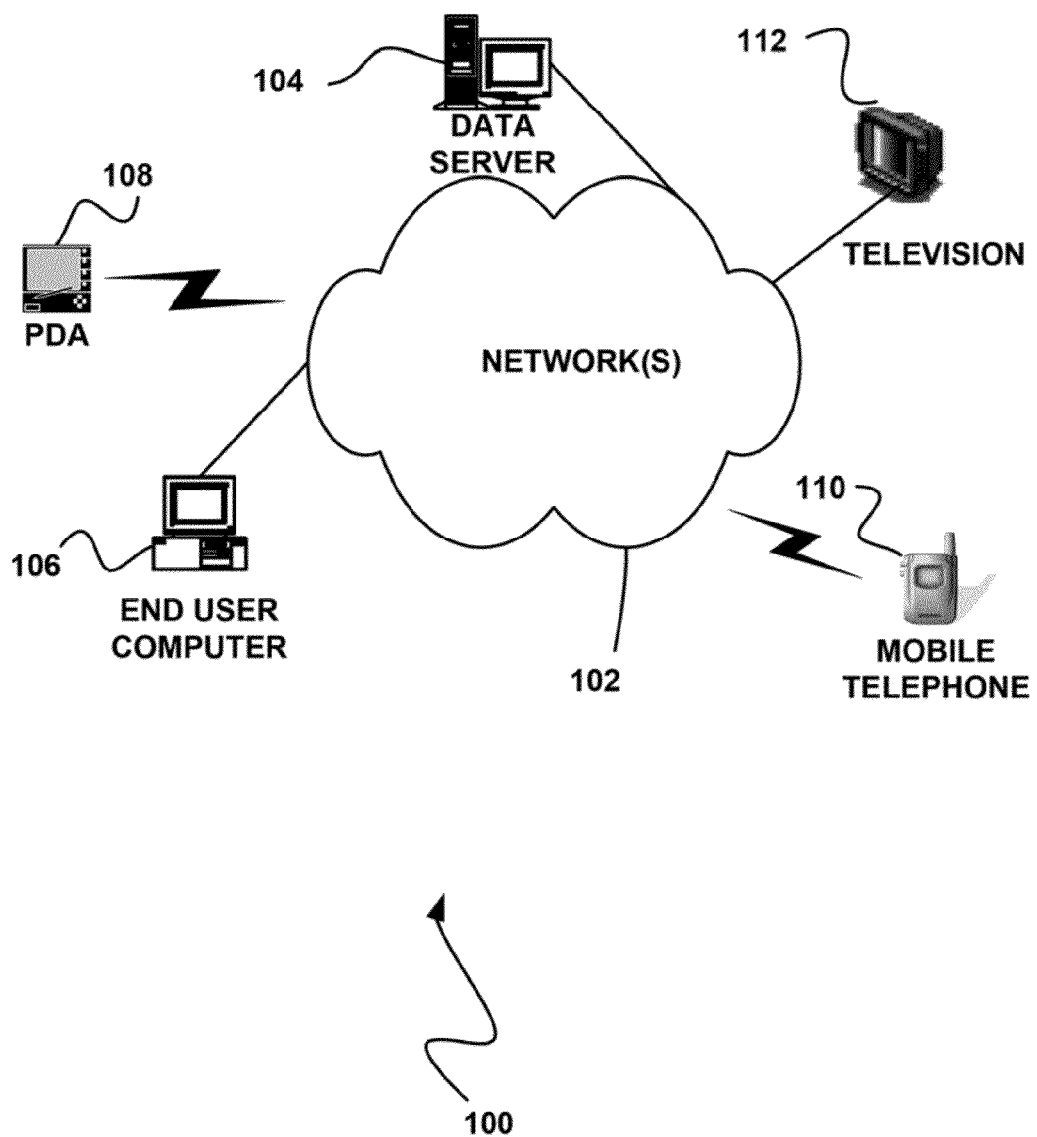
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
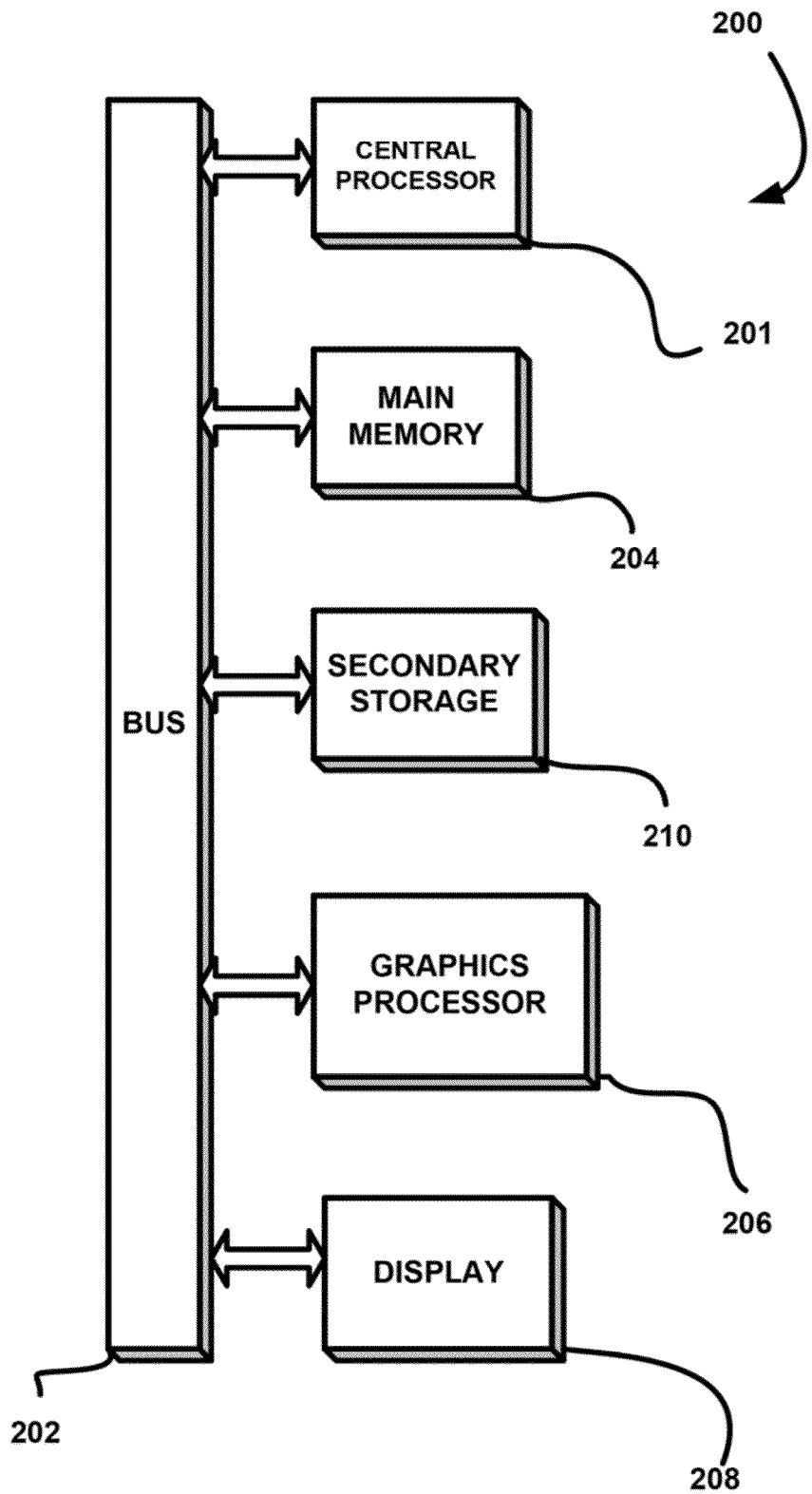
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
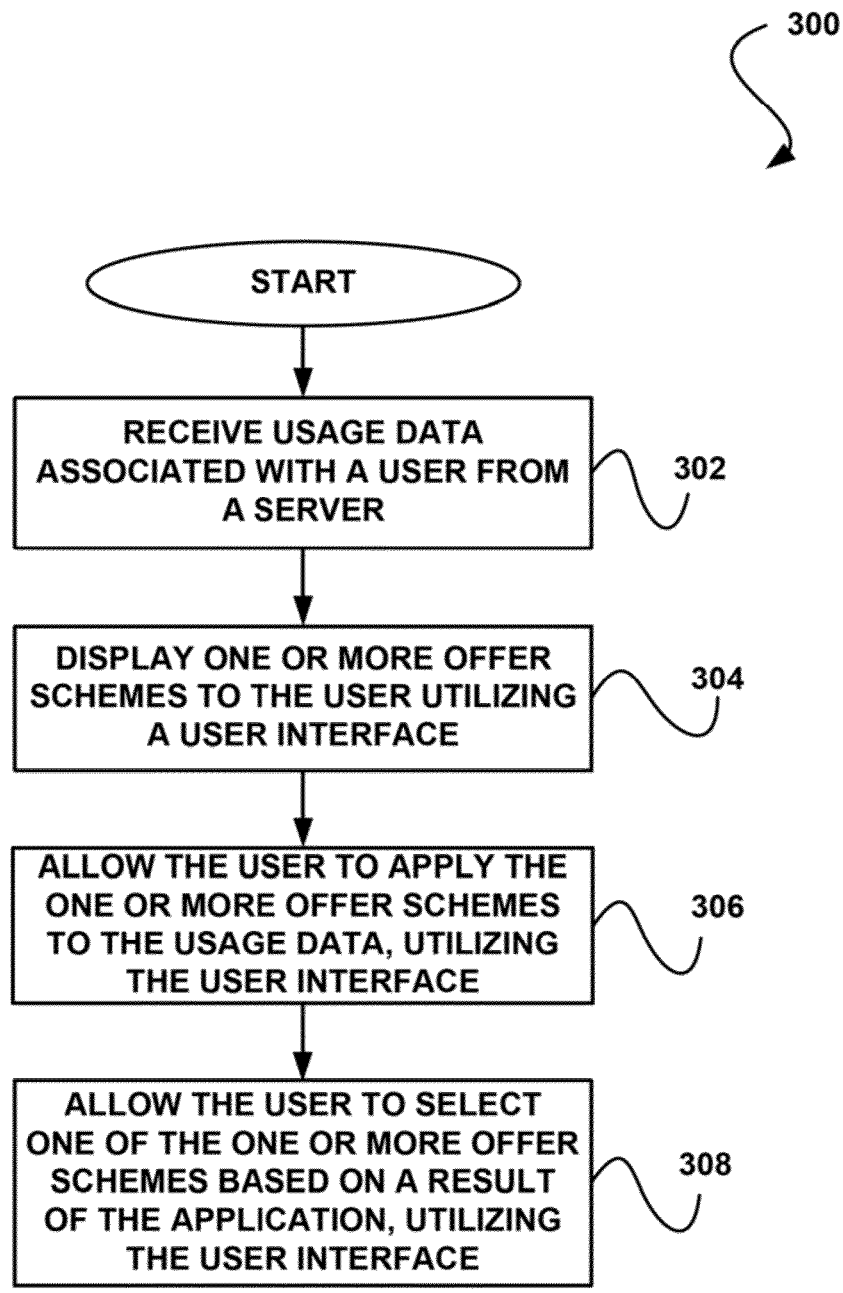
FIG. 3 shows a method for applying an offer scheme to usage data using a user interface, in accordance with one embodiment.

FIG. 3 shows a method 300 for applying an offer scheme to usage data using a user interface, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

In operation, usage data associated with a user is received from a server. See operation 302. The usage data may be received from the server in a variety of ways.

For example, in one embodiment, the usage data may be received from an email. In this case, the usage data may be sent automatically from the server. In one embodiment, the email may be sent automatically in response to a query by the user.

In another embodiment, the usage data may be capable of being downloaded from the server. As an option, the usage data may be downloaded in response to a user query. As another option, the usage data may be downloaded automatically. In this case, the usage data may be downloaded automatically upon a successful login from the user. The successful login may include a login to the server and/or an application for applying the offer scheme to the usage data (e.g. hosted by a local device, hosted by a server, etc.).

In the context of the present description, usage data refers to any chargeable activity or service usage associated with a user. For example, in various embodiments, the usage data may include, but is not limited to, previous chargeable activity, previous billed activity, and/or any other activity that meets the above definition.

In addition to receiving the usage data, one or more offer schemes are displayed to the user using a user interface. See operation 304. In the context of the present description, an offer scheme refers to any offer or offer arrangement for a service and/or product. For example, in various embodiments, the offer scheme may include, but is not limited to, an offer for a cellular or other phone service, an offer for an Internet service, an offer for a television or cable service, an offer for a broadband data service, and/or any other offer scheme that meets the above definition.

Once the offer schemes are displayed, the user is allowed to apply the one or more offer schemes to the usage data, utilizing the user interface. See operation 306. In one embodiment, displaying the one or more offer schemes to the user using the user interface may include displaying a list including the one or more offer schemes. In this case, the user may be allowed to apply each of the one or more offer schemes in the list to the usage data.

Applying the offer schemes to the usage data refers to any evaluation of the offer schemes using the usage data. For example, in one embodiment, the usage data may be used as input data for the offer scheme. In another embodiment, information associated with the usage data may be used as input to the offer schemes. In various embodiments, this information may include a usage time (e.g. minutes used, etc.), a data use (e.g. an amount of data downloaded, etc.), a number of calls, a number of texts, a number of long distance calls, a number of local calls, and/or any other information associated with usage data.

Still yet, the user is allowed to select one of the one or more offer schemes based on a result of the application, utilizing the user interface. See operation 308. The result of the application may include any result of the application.

For example, in one embodiment, the result of the application may include a charge. In this case, the charge may include a predicted charge based on applying the one or more offer schemes to the usage data. Thus, based on past usage, a future charge may be predicted or estimated by applying the offer scheme to the usage data.

In another embodiment, the result of the application may include one or more billable elements. In the context of the present description, billable elements refer to any item associated with billing. For example, in various embodiments, the billable elements may include event ratings, charges, taxes, service charges, and/or any other billable element.

In one embodiment, one or more billable elements may be sent to a service provider. In this case, the service provider may be a service provider that presented the offer scheme. In some cases, the service provider may be capable of generating an invoice using the one or more billable elements. In these cases, the invoice may be presented to the user.

As an option, the invoice may be presented the user using the user interface. In another embodiment, the invoice may be presented to the user on an interface separate from the user interface. In yet another embodiment, the invoice may be mailed or emailed to the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
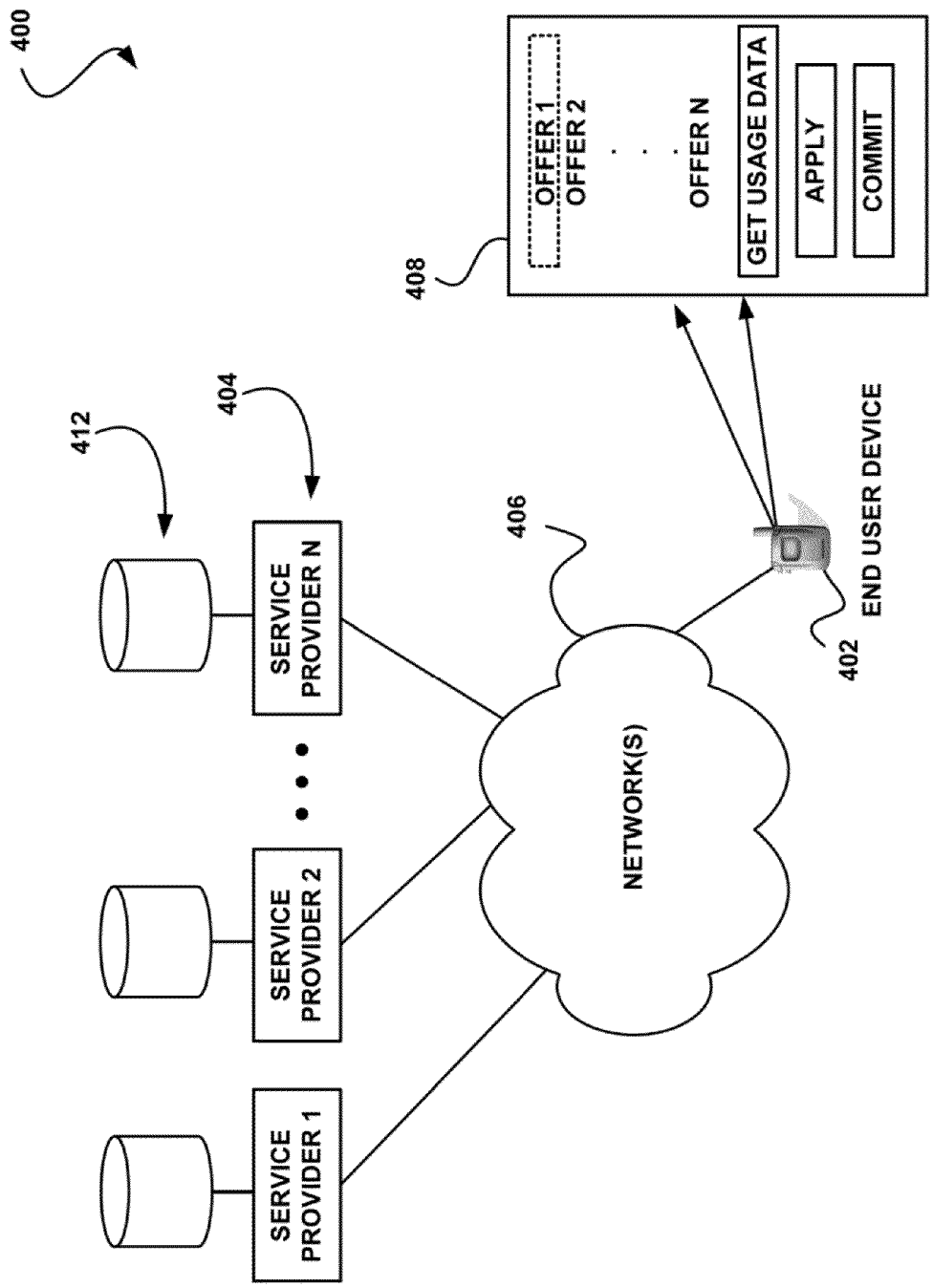
FIG. 4 shows a system for applying an offer scheme to usage data using a user interface, in accordance with one embodiment.

FIG. 4 shows a system 400 for applying an offer scheme to usage data using a user interface, in accordance with one embodiment. As an option, the system 400 may be implemented in the context of the details of FIGS. 1-3. Of course, however, the system 400 may be implemented in any desired environment. Further, the aforementioned definitions may equally apply to the description below.

As shown, a user device 402 may communicate with one or more service provider servers 404 over one or more networks 406. The user device 402 may include any user device capable of executing a local computer program and/or a program over the network 406. For example, in various embodiments, the user device may include a PDA, a computer, a mobile phone, a handheld computing device, or any other device capable of executing a local computer program and/or a program over the network 406.

Furthermore, the network 406 may include any network such as a LAN, a wireless network, a WAN such as the Internet, peer-to-peer network, cable network, etc. Still yet, the service provider servers 404 may include servers associated with any type of service provider. For example, in various embodiments, the service provider may include a land line service provider, a mobile phone service provider, a data service provider, an Internet service provider, and/or any other provider of a service.

In operation, users (e.g. customers, etc.) may calculate a bill on a home computer or mobile device, such as the user device 402. The customer may download a billing application from at least one of the service provider severs 404. The customer may also use the billing application to receive updates of chargeable activity data.

These updates may include daily, weekly, monthly, and/or any other periodic update. The customer may then use the billing software to try and evaluate several offer schemes. The customer may continue this evaluation until the customer finds the offer scheme that best fits the needs of the customer. The customer may then elect to commit to the offer scheme.

In many cases, a service provider that provides billable services calculates the chargeable activity of each of its customers periodically and produces a bill which is calculated according to the pre-agreed contract with the customer. The service provider then sends the bill to the customers for payment.

However, using the system 400, a tool may be supplied to customers by a service provider such that the customers are able to perform the bill calculation on a personal user device, such as a personal computer or personal mobile device. In this way, the customer will have the flexibility to try out multiple offers until the customer finds the offer that best fits the needs of the customer.

In one embodiment, the customer may start the service by downloading and installing the billing software to the personal user device 402. As an option, the software may be upgraded periodically as needed. These updates may be implemented using standard techniques for software upgrades.

After installing the software, the customer may register to a home billing service. In one embodiment, this may be accomplished both at the device on which the customer is subscribed (e.g. a post paid mobile phone, etc.) and any other device with relevant system abilities.

In one configuration, the service provider may be able to run a billing process for customers who are registered, but instead may extract usage data of the customer for the last billing period. The service provider may then notify the customers that they may begin the home billing process.

Once customers receive a notification, they may begin the home billing process. In various embodiments, the process may be initiated by the service provide and/or by the customer, such as a bill on demand configuration. In this case, the service provider may extract usage data of the customer based on the customer request.

In one embodiment, customers may log in to the home billing software using a secure ID and password. As an option, this secure ID and/or password may be provided by the service provider. Furthermore, the secure ID and/or password may be configured to be changed based on one or more security rules associated with the service provider.

Customers may then download the usage data to the home billing software from the service provider server 404. In another embodiment, the distribution of home billing data may also be accomplished by email or any other technique for acquiring the usage data. In various embodiments, the usage data download or acquisition may be initiated periodically, by the customer, and/or by the service provider.

Once the usage data is available, customers may browse through a list of possible offers using a user interface 408 provided by the billing software. An update module may be utilized by the service provider to update the offers used by the home billing system as needed. For each offer, the customer may apply the offer against the usage data. In this way, the customer may be able to determine how much the charges will be.

Once customers find the offer that best suites them, they may finalize the offer by committing to the offer. Offer commitment may be accomplished in different ways. For example, in various embodiments, the customer may commit the offer or commit the data.

For example, offer commitment may include the home billing software sending an offer ID back to the service provider. The offer ID may include any item for identifying the customer selected offer. For example, in one embodiment, the offer ID may include an offer code (e.g. numbers and/or characters, etc.).

In another embodiment, the offer ID may include a name of the offer. Of course, in various other embodiments, the offer ID may include any identifier for identifying the offer. Using this offer ID, the service provider may then rate the usage of the customer based on the appropriate offer. As part of this rating, the service provider may produce charges and a bill normally.

In another embodiment, the data may be committed. In this case, the home billing software may send back billable elements that were calculated as a result of the application of the offer scheme to the usage data. These billable elements may include any elements associated with billing, such as the rated events, any charges, taxation, and any other calculated billable elements.

The service provider may then use these billable elements to generate an invoice for the customer. In one embodiment, this invoice may be stored in an accounting database 412 associated with the service provider and/or on the user device 402.

Independent of the commitment technique, an invoice may be delivered to the customer for payment. In various embodiments, the invoice may be delivered by the service provider and/or by the home billing software. It should be noted that, in various embodiments, the billing software may be stored on the user device 402 or on the service provider server 404 and executed by the user device 402.

Furthermore, in one embodiment, a bill may not be able to be finalized twice for the same bill period. In this case, once a bill is finalized the offer/bill is the selection of the customer for the bill period.

In one embodiment, if customers do not react to a notification message to create a bill within a predetermined amount of time, and do not create their bill after a predetermined time (e.g. days, weeks, etc.), the service provider may generate a bill for the customer as normal. Once the service provider generates the bill, the customers may be prohibited from creating their own bill using the home billing system for this period.

Thus, in addition to plans which rate the usage of customers by various options to determine an optimal plan according to an algorithm defined by the service provider, the customers may now choose which offer to rate.

Additionally, instead of only calculating the bills at a server of a service provider, which requires the service provider to have a large facility to support bill generation for large numbers of customers, using the home billing software allows the activity of bill generation to be distributed across a personal computer and/or mobile device of a customer. This may reduce the facilities required by the service provider.

Figure 5A:
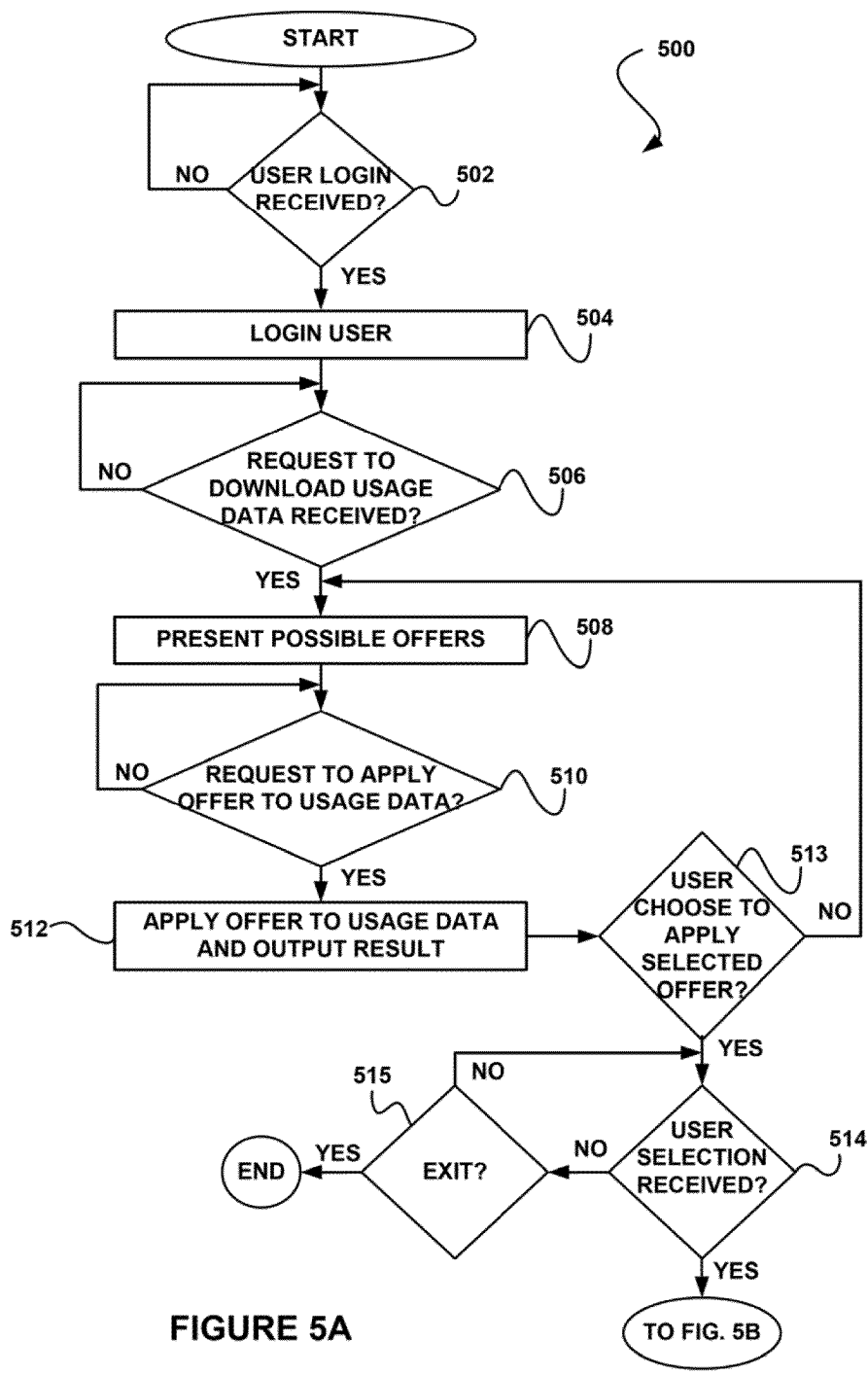
FIGS. 5A and 5B show a method for applying an offer scheme to usage data using a user interface, in accordance with another embodiment.
Figure 5B:
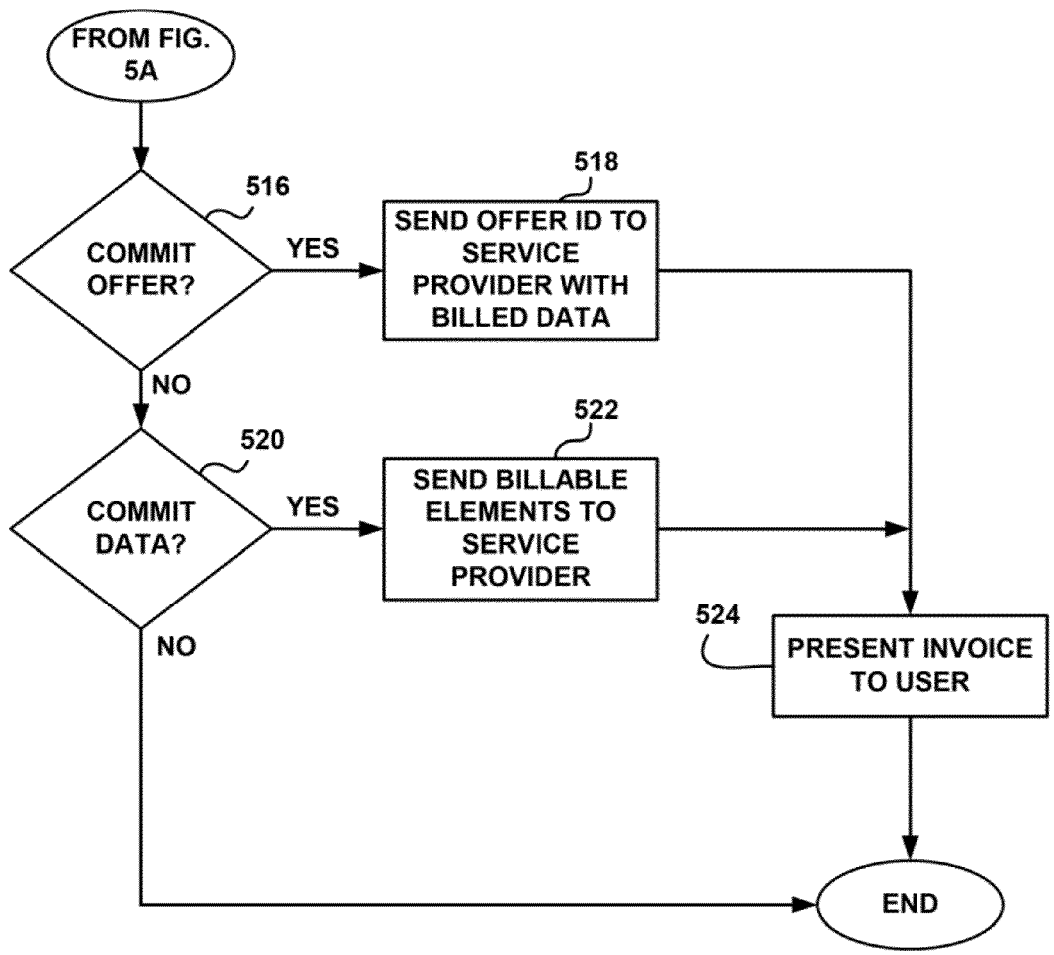

FIGS. 5A and 5B show a method 500 for applying an offer scheme to usage data using a user interface, in accordance with another embodiment. As an option, the method 500 may be implemented in the context of the details of FIGS. 1-4. Of course, however, the method 500 may be carried out in any desired environment. Again, the aforementioned definitions may equally apply to the description below.

As shown, it is determined if a correct user login is received. See operation 502. In one embodiment, the user login may include a user name and password. In various embodiments, the login may be initiated using a home billing application interface or an online interface associated with a service provider.

If the correct user login is received, the user is logged in. See operation 504. In this case, the user may be logged into the home billing software application and/or a server associated with the service provider.

After the user is logged in, it is determined whether a request to download usage data is received. See operation 506. The request may be received from the user using an interface of the home billing software application.

The request may be received at an interface associated with the billing application and/or the service provider. If a request to download usage data is received, the service provider may provide the usage data to the billing software application. In one embodiment, this usage data may be presented to the user utilizing the user interface associated with the home billing software application.

Additionally, the user is presented with possible offers. See operation 508. For example, one or more service providers may send an offer or different offers such that the user interface is capable of presenting the offers to the user (e.g. in a list, etc.).

The user may then be permitted to apply the offer against the usage data. Thus, it is determined whether a request to apply an offer to the usage data is received. See operation 510.

In this case, the request to apply the offer to the usage data may be generated by the user using the user interface. For example, the user may select an offer to apply in a list of offers and then select an apply option. In one embodiment, the user may have the ability to apply the offer to certain aspects of the user data.

If it is determined that there is a request to apply an offer to the usage data, the offer is applied to the usage data and a result of the application is output. See operation 512. The result may include any elements associated with billing, such as the rated events, any charges, taxation, and any other calculated billable elements.

It is further determined whether a user has chosen to apply an offer. See operation 513. If a user has chosen to apply an offer, it is then determined whether a user selection of an offer is received. See operation 514. In this case, selecting one of the offer schemes may include committing to the selected offer.

In various embodiments, this may include committing the offer to the service provider or committing data resulting from the application to the service provider. In one embodiment, the type of commitment may be based on a user defined preference. In another embodiment, the type of commitment may be based on a service provider defined preference. In yet another embodiment, only one of the types of commitments may be available.

If no user selection is detected, it is determined whether to exit. See operation 515. As an option, this determination may be based on a user selection.

In one embodiment, committing to the selected offer may include committing the offer to the service provider. As shown in FIG. 5B, it is determined whether to commit the offer to the service provider. See operation 516.

If it is determined to commit the offer to the service provider, an offer ID is sent to the service provider along with billed data. See operation 518. Thus, committing to the selected offer may include sending an offer identifier associated with the selected offer to the service provider.

The service provider may be capable of utilizing the offer identifier to determine a rate of a future usage of the user. Additionally, the service provider may be capable of producing charges based on the rate of the future usage of the user.

It is further determined whether to commit the data to the service provider. See operation 520. If it is determined to commit the data, the billable elements generated in the application of the offer to the usage data are sent to the service provider. See operation 522.

Using this information, the service provider is able to bill the user. In one embodiment, the user may use the user interface associated with a billing application stored on a local device to self-bill. Additionally, the user and/or the service provider may create and provide an invoice associated with the billed events.

Once the invoice is generated, the invoice may be presented to the user. See operation 524. For example, the invoice may be presented to the user using the user interface associated with the billing software. In another embodiment, the invoice may be presented to the user through an email. In another embodiment, the invoice may be presented to the user on a separate user interface.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving usage data associated with a user from a server, wherein the usage data is received from an email, the usage data includes previous chargeable activity associated with the user, and the usage data is associated with a predetermined past billing period, and wherein the usage data is sent from the server via the email in response to a query by the user;
    displaying at least two offer schemes to the user, utilizing a user interface, comprising displaying a list including the at least two offer schemes, each offer scheme including an offer for one or more of a service and a product;
    receiving from the user, utilizing the user interface, a selection of a first offer scheme from the list including the at least two offer schemes;
    in response to receiving the selection of the first offer scheme from the list including the at least two offer schemes, applying the selected first offer scheme in the list to the usage data by inputting the usage data to the selected first offer scheme;
    displaying, in association with the selected first offer scheme, a result of the application of the selected first offer scheme to the usage data, wherein the result of the application of the selected first offer scheme includes a predicted charge for the previous chargeable activity under the selected first offer scheme;
    receiving from the user, utilizing the user interface, a selection of a second offer scheme from the list including the at least two offer schemes;
    in response to receiving the selection of the second offer scheme from the list including the at least two offer schemes, applying the selected second offer scheme in the list to the usage data by inputting the usage data to the selected second offer scheme;
    displaying, in association with the selected second offer scheme, a result of the application of the selected second offer scheme to the usage data, wherein the result of the application of the selected second offer scheme includes a predicted charge for the previous chargeable activity under the selected second offer scheme;
    receiving from the user, utilizing the user interface, a subsequent selection of the second offer scheme based on a result of the application of the selected second offer scheme to the usage data; and
    in response to receiving the subsequent selection of the second offer scheme, transmitting at least one billable element associated with the user to a service provider that provides the second offer scheme for use by the service provider in generating an invoice according to the second offer scheme using the at least one billable element;
    wherein the subsequent selection of the second offer scheme received from the user includes a commitment to the second offer scheme and an offer identifier associated with the second offer scheme, wherein the offer identifier is transmitted with the at least one billable element associated with the user to the service provider that provides the second offer scheme, and wherein the service provider that provides the second offer scheme utilizes the offer identifier to determine a rate of a future usage of the user, and produces charges based on the rate of the future usage of the user.

2. The method of claim 1, wherein the usage data is capable of being downloaded from the server.

3. The method of claim 1, wherein the at least one billable element includes event ratings.

4. The method of claim 1, wherein the at least one billable element includes charges.

5. The method of claim 1, wherein the at least one billable element includes taxes.

6. The method of claim 1, further comprising presenting the invoice to the user.

7. A computer program product embodied on a non-transitory computer readable medium, comprising:
    computer code for receiving usage data associated with a user from a server, wherein the usage data is received from an email, the usage data includes previous chargeable activity associated with the user, and the usage data is associated with a predetermined past billing period, and wherein the usage data is sent from the server via the email in response to a query by the user;

computer code for displaying at least two offer schemes to the user, utilizing a user interface, comprising displaying a list including the at least two offer schemes, each offer scheme including an offer for one or more of a service and a product;

computer code for receiving from the user, utilizing the user interface, a selection of a first offer scheme from the list including the at least two offer schemes;

computer code for, in response to receiving the selection of the first offer scheme from the list including the at least two offer schemes, applying the selected first offer scheme in the list to the usage data by inputting the usage data to the selected first offer scheme;

computer code for displaying, in association with the selected first offer scheme, a result of the application of the selected first offer scheme to the usage data, wherein the result of the application of the selected first offer scheme includes a predicted charge for the previous chargeable activity under the selected first offer scheme;

computer code for receiving from the user, utilizing the user interface, a selection of a second offer scheme from the list including the at least two offer schemes;

computer code for, in response to receiving the selection of the second offer scheme from the list including the at least two offer schemes, applying the selected second offer scheme in the list to the usage data by inputting the usage data to the selected second offer scheme;

computer code for displaying, in association with the selected second offer scheme, a result of the application of the selected second offer scheme to the usage data, wherein the result of the application of the selected second offer scheme includes a predicted charge for the previous chargeable activity under the selected second offer scheme;

computer code for receiving from the user, utilizing the user interface, a subsequent selection of the second offer scheme based on a result of the application of the selected second offer scheme to the usage data;

and computer code for, in response to receiving the subsequent selection of the second offer scheme, transmitting at least one billable element associated with the user to a service provider that provides the second offer scheme for use by the service provider in generating an invoice according to the second offer scheme using the at least one billable element;

wherein the computer program product is operable such that the subsequent selection of the second offer scheme received from the user includes a commitment to the second offer scheme and an offer identifier associated with the second offer scheme, wherein the offer identifier is transmitted with the at least one billable element associated with the user to the service provider that provides the second offer scheme, and wherein the service provider that provides the second offer scheme utilizes the offer identifier to determine a rate of a future usage of the user, and produces charges based on the rate of the future usage of the user.

8. An apparatus, comprising:

a server configured for:

receiving usage data associated with a user from another server, wherein the usage data is received from an email, the usage data includes previous chargeable activity associated with the user, and the usage data is associated with a predetermined past billing period, and wherein the usage data is sent from the other server via the email in response to a query by the user;

displaying at least two offer schemes to the user, utilizing a user interface, comprising displaying a list including the at least two offer schemes, each offer scheme including an offer for one or more of a service and a product;

receiving from the user, utilizing the user interface, a selection of a first offer scheme from the list including the at least two offer schemes;

in response to receiving the selection of the first offer scheme from the list including the at least two offer schemes, applying the selected first offer scheme in the list to the usage data by inputting the usage data to the selected first offer scheme;

displaying, in association with the selected first offer scheme, a result of the application of the selected first offer scheme to the usage data, wherein the result of the application of the selected first offer scheme includes a predicted charge for the previous chargeable activity under the selected first offer scheme;

receiving from the user, utilizing the user interface, a selection of a second offer scheme from the list including the at least two offer schemes;

in response to receiving the selection of the second offer scheme from the list including the at least two offer schemes, applying the selected second offer scheme in the list to the usage data by inputting the usage data to the selected second offer scheme;

displaying, in association with the selected second offer scheme, a result of the application of the selected second offer scheme to the usage data, wherein the result of the application of the selected second offer scheme includes a predicted charge for the previous chargeable activity under the selected second offer scheme;

receiving from the user, utilizing the user interface, a subsequent selection of the second offer scheme based on a result of the application of the selected second offer scheme to the usage data;

and in response to receiving the subsequent selection of the second offer scheme, transmitting at least one billable element associated with the user to a service provider that provides the second offer scheme for use by the service provider in generating an invoice according to the second offer scheme using the at least one billable element;

wherein the apparatus is operable such that the subsequent selection of the second offer scheme received from the user includes a commitment to the second offer scheme and an offer identifier associated with the second offer scheme, wherein the offer identifier is transmitted with the at least one billable element associated with the user to the service provider that provides the second offer scheme, and wherein the service provider that provides the second offer scheme utilizes the offer identifier to determine a rate of a future usage of the user, and produces charges based on the rate of the future usage of the user.

9. The method of claim 6, wherein the invoice is presented to the user utilizing the user interface by which the user applies the first offer scheme and the second offer scheme from the list including the at least two offer schemes to the usage data.

10. The method of claim 1, wherein if the user fails to react to a notification message to create a bill utilizing the list including the at least two offer schemes within a predetermined amount of time, and does not create the bill after the predetermined amount of time, a bill is generated for the user based on a previous selection of an offer scheme.

11. The method of claim 1, wherein both of the first offer scheme and the second offer scheme from the list including the at least two offer schemes are provided by the service provider.

12. The method of claim 1, wherein the first offer scheme is provided by another service provider different from the service provider that provides the second offer scheme, such that the list including the at least two offer schemes includes offer schemes provided by multiple service providers.

13. The method of claim 1, wherein the selection of the first offer scheme from the list including the at least two offer schemes includes receiving from the user, utilizing the user interface, a selection of certain aspects of the usage data such that the selected first offer scheme is applied only to the certain aspects of the usage data.

* * * * *